United States Patent [19]
Hagino et al.

[11] Patent Number: 5,079,633
[45] Date of Patent: Jan. 7, 1992

[54] VIDEO SIGNAL PROCESSOR FOR REMOVING HIGH FREQUENCY NOISE COMPONENT

[75] Inventors: Hideyuki Hagino, Fukaya; Tatsuya Matsuki, Kawasaki, both of Japan

[73] Assignee: Kabushiki Kaisha Toshiba, Kawasaki, Japan

[21] Appl. No.: 517,706

[22] Filed: May 2, 1990

[30] Foreign Application Priority Data

May 15, 1989 [JP] Japan ................... 1-121211

[51] Int. Cl.$^5$ ........................... H04N 5/213
[52] U.S. Cl. ..................... 358/167; 358/36; 358/37; 358/166; 358/340
[58] Field of Search ............. 358/167, 166, 36, 37, 358/340, 314, 315, 316, 318, 327, 328, 336, 905

[56] References Cited

U.S. PATENT DOCUMENTS

| | | | |
|---|---|---|---|
| 4,597,021 | 6/1986 | Yamamitsu | 358/340 |
| 4,612,585 | 9/1986 | Takase | 358/328 |
| 4,626,927 | 12/1986 | Hirota | 358/340 |
| 4,658,305 | 4/1987 | Tsushima | 358/167 |

FOREIGN PATENT DOCUMENTS 6010925 1/1985 Japan .

OTHER PUBLICATIONS

"Document of VTR-Designed Most-Advanced Techniques", Japan, pp. 167-168.

*Primary Examiner*—Howard W. Britton
*Assistant Examiner*—Sherrie Hsia
*Attorney, Agent, or Firm*—Banner, Birch, McKie & Beckett

[57] ABSTRACT

A video signal processor comprises a first filtering circuit, a first and a second emphasis circuits, a noise removing circuit, and a converter. The first filtering circuit filters an input video signal, and extracts a low frequency component. The first emphasis circuit emphasizes the low frequency component, and outputs a first emphasized signal. The second emphasis circuit emphasizes the first emphasized signal, and outputs a second emphasized signal. The noise removing circuit removes a noise component from either the first emphasized signal or the second emphasized signal, and outputs the noise-removed signal. The converter converts the noise-removed signal into a frequency-modulated signal.

20 Claims, 6 Drawing Sheets

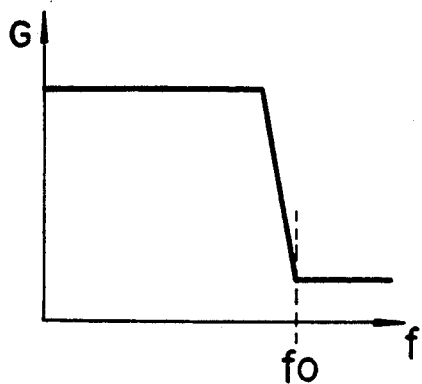
F I G. 2A
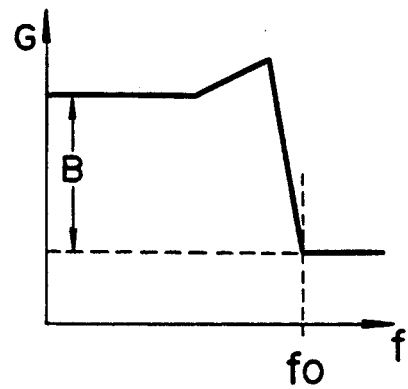
F I G. 2B
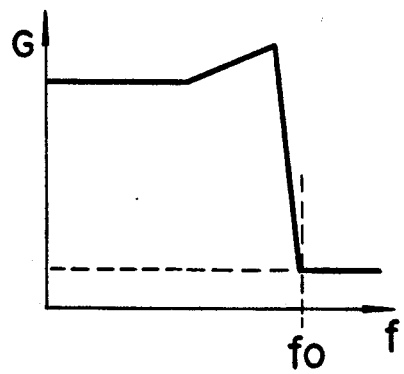
F I G. 2C
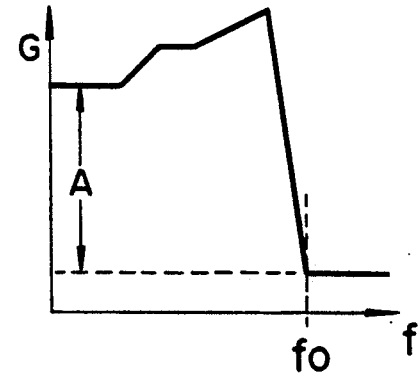
F I G. 2D

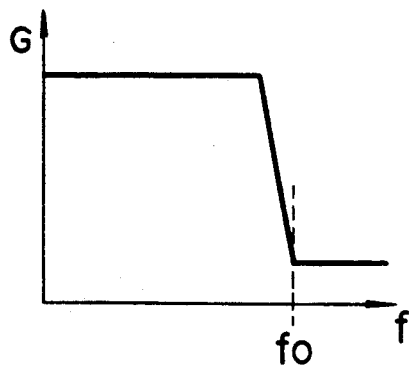
F I G. 5A
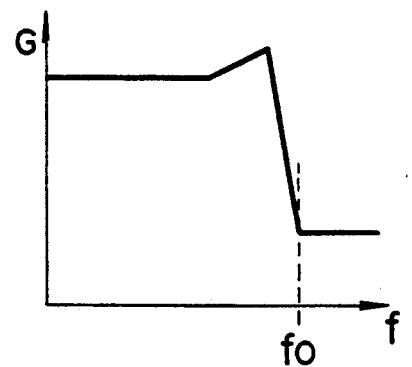
F I G. 5B
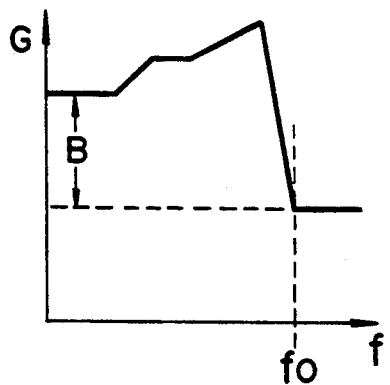
F I G. 5C
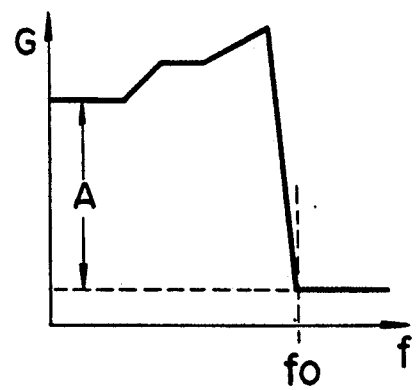
F I G. 5D

VIDEO SIGNAL PROCESSOR FOR REMOVING HIGH FREQUENCY NOISE COMPONENT

BACKGROUND OF THE INVENTION

1. Field of the Invention

The present invention relates to a video signal processor for recording and, more particularly to a video signal processor for recording a video signal in a video cassette recorder (VCR).

2. Description of the Related Art

Conventionally, a video signal processor such as a video tape recorder comprises the following arrangements.

Specifically, a video input signal is supplied to a low pass filter (LPF) and a band pass filter (BPF), and divided into a luminance signal (Y) and a chrominance signal (C). The luminance signal is sequentially emphasized by a non-linear emphasis circuit and a video emphasis (preemphasis) circuit and, after the luminance signal is frequency-modulated by an FM modulator, the luminance signal is supplied to an adder. On the other hand, the chrominance signal is supplied to a frequency converter via an automatic chroma controller (ACC) and frequency-modulated, and supplied to the adder. The frequency-modulated luminance signal and the frequency-converted chrominance signal are added by the adder and supplied to a video header via a recording amplifier. In this manner, the video input signal is supplied onto a recording tape.

In the above-mentioned conventional video signal processor, there was a problem in that the luminance signal was processed by the non-linear emphasis and the video emphasis, thereby a high frequency noise component was emphasized.

SUMMARY OF THE INVENTION

Accordingly, it is an object of the present invention is to provide a video signal processor which can obtain a high quality of image in reproduction by removing a high frequency noise signal component from a luminance signal processed by a non-linear emphasis and a video emphasis.

To attain the above object, the video signal processor of the present invention comprises:

first filter means for filtering an input video signal and extracting a low frequency component;

first emphasis means for emphasizing said low frequency component extracted by said first filter means, and outputting a first emphasized signal;

second emphasis means for emphasizing said first emphasized signal output by said first emphasis means, and outputting a second emphasized signal;

noise removing means for removing a noise component from either said first emphasized signal output by said first emphasis means or said second emphasized signal output by said second emphasis means, and outputting a noise-removed signal; and converting means for converting said noise-removed signal output by said noise removing mean into a frequency-modulated signal.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A to 2D are diagrams of frequency characteristics to explain the embodiment of FIG. 1;

FIGS. 5A to 5D are diagrams of frequency characteristics to explain the embodiment of FIG. 4.

DETAILED DESCRIPTION OF THE PREFERRED EMBODIMENTS

Generally, a VHS-typed VCR has two kinds of recording modes, i.e., an SP mode and an EP mode If an input signal of 3 MHz or more in the EP mode is emphasized by emphasis will be 4 to 6 dB and if it is emphasized by the video emphasis, the maximum amount of the emphasis will be 14 to 16 db. Therefore, a small signal level will be partially 20 dB or more. However, since the components other than a signal component band-limited by a low pass filter are noise, the noise component is emphasized in a non-linear emphasis circuit and a video emphasis circuit. Therefore, in the conventional circuit, the signal component of 0 to 3 MHz and the noise component of 3 MHz or more are frequency-modulated. For this reason, if these components are recorded and reproduced, there is a problem in that an S/N ratio is lowered and a high quality of image cannot be obtained.

The present invention has been made to solve the above-mentioned problem.

The embodiments of the present invention will be explained with reference to the drawings.

Figure 1:
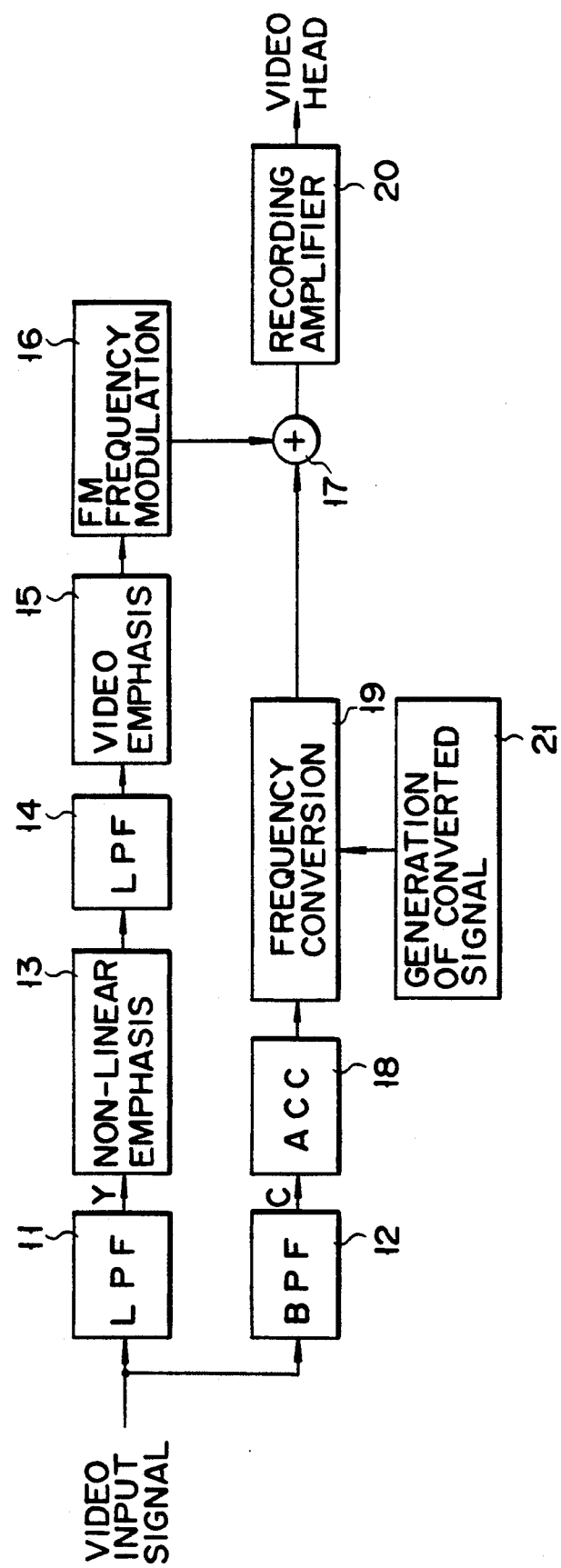
FIG. 1 is a circuit diagram showing an embodiment of a video signal processor of the present invention.

FIG. 1 is a block diagram showing a circuit structure of one embodiment of the present invention. In FIG. 1, a video input signal is supplied to a low pass filter (LPF) 11 in which a cut-off frequency is set to $f_0$ and a band pass filter (BPF) 12 and an luminance signal (Y) and a chrominance signal (C) are separated therefrom. The luminance signal is emphasized by a nonlinear emphasis circuit 13. The non-linear emphasis circuit 13 performs emphasis in such a manner that a gain is changed in accordance with an input level. This circuit is also called a subemphasis circuit. The output of the non-linear emphasis circuit 13 is supplied to a low pass filter 14 whose cutoff frequency is set to $f_0$, and a signal band-limited thereby is supplied to a video emphasis (preemphasis) circuit 15 and emphasized. The emphasized signal is frequency-modulated by a frequency modulator 16 and supplied to an adder 17. The above video emphasis circuit 15 performs emphasis with a predetermined gain characteristic regardless of the input level. This circuit is also called a main emphasis circuit.

The chrominance signal is supplied to a frequency converter 19 via an automatic chroma control circuit (ACC) 18, thereby the chrominance signal is frequency-converted and supplied to the adder 17. Then, the frequency-modulated luminance signal and the frequency-converted signal are added by the adder 17, thereafter, these signals are supplied to a video head via a recording amplifier 20, and recorded on a tape. Reference numeral 21 is a conversion signal generator for generating a signal which is used when a frequency-conversion is performed by the above frequency converter 19.

An operation of the above-arranged circuit will be explained by the use of frequency characteristics of FIGS. 2A to 2D. First of all, the luminance signal is separated from the video input signal by the low pass filter 11. FIG. 2A shows an output characteristic of the low pass filter 11. As shown in this figure, the luminance signal component, which is a signal component (low frequency component) whose cutoff frequency is $f_0$ or less, has a constant gain (G) which is sufficiently high. However, the gain of a noise signal component (high frequency component) having frequency of $f_0$ or more is controlled low. The luminance signal component separated by the low pass filter 11 is emphasized by the non-linear emphasis circuit 13 and an output characteristic as shown in FIG. 2B can be obtained. Then, the high frequency noise component is removed from the output of the non-linear emphasis circuit 14 by the low pass filter 14. FIG. 2C shows the output characteristic of the low pass filter 14. Thereafter, the luminance signal component is further emphasized by a video emphasis circuit 15 and an output characteristic as shown in FIG. 2D can be obtained. As shown in the drawing, the luminance signal component, which is the signal component whose cutoff frequency is $f_0$ or less, has a constant gain (G) which is sufficiently high. However, the gain of the noise signal component having frequency of $f_0$ or more is controlled low.

In the circuit of the above embodiment, the difference between the current level of the signal to be supplied to the frequency modulator 16 and the level having frequency of $f_0$ is shown by A of FIG. 2D. On the other hand, in the conventional circuit, such a difference is shown by B of FIG. 2B. Thereby, it turns out that the high frequency noise signal component, which is included in the signal to be supplied to the frequency modulator 16, is largely reduced as compared with the conventional circuit. As a result, since the noise component to be supplied to the video head is lessened, a good quality image can be obtained when the signal is once recorded, and then reproduced.

Figure 3:
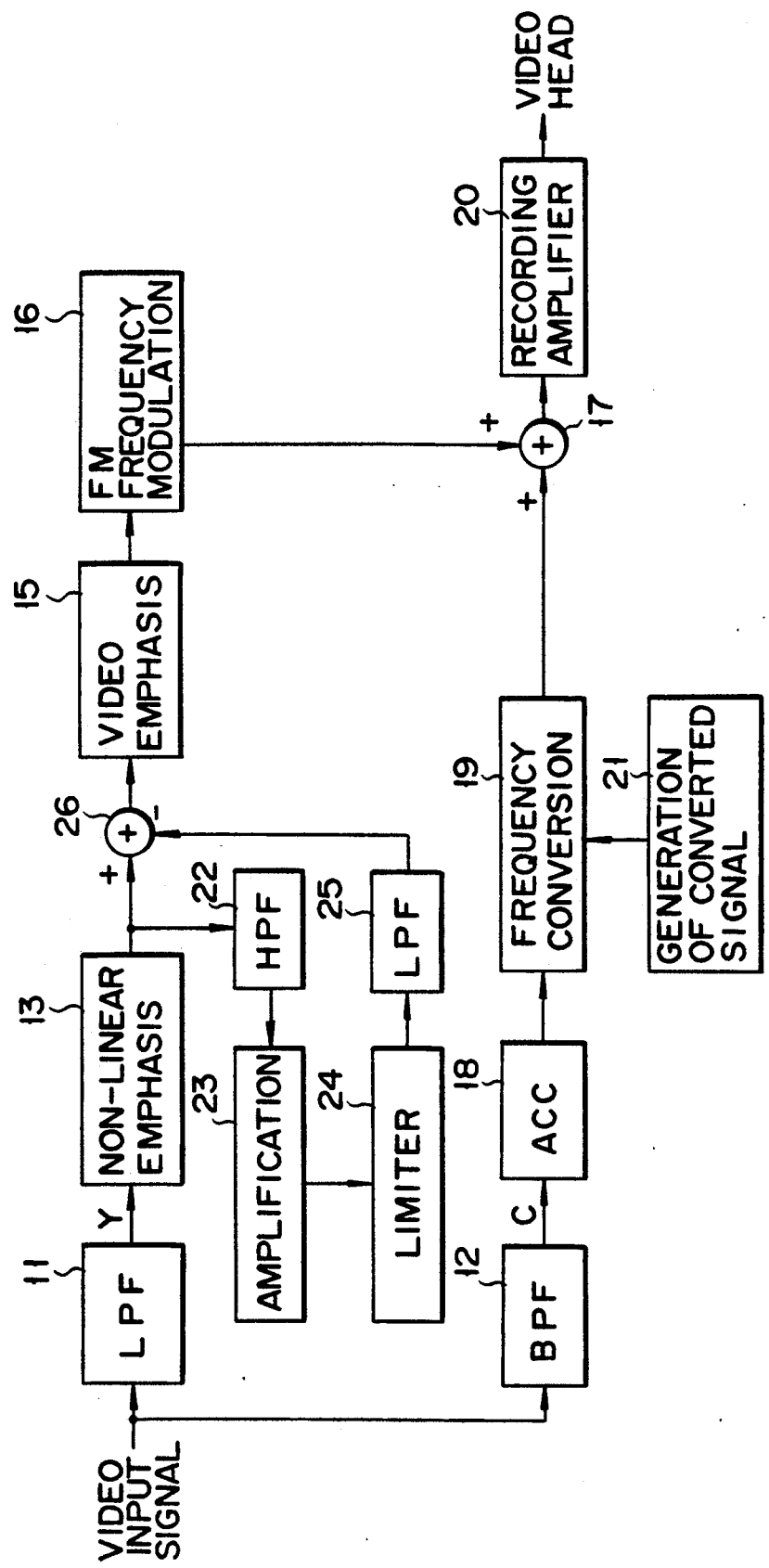
FIG. 3 is a circuit diagram showing another embodiment of the present invention.

FIG. 3 is a block diagram showing a circuit structure of the other embodiment of the present invention. In the circuit of the embodiment of FIG. 1, the low pass filter 14 is provided in order to remove the high frequency signal component which is generated when the signal is emphasized by the non-linear emphasis circuit 13. In the circuit of this embodiment, in place of the low pass filter 14, the high frequency signal component is extracted by a circuit comprising a high pass filter (HPF) 22, an amplifier 23, a limiter 24 and a low pass filter (LPF) 25. Moreover, the extracted noise signal is subtracted from the emphasized signal by a subtracter 26, thereby a signal, which does not include a noise signal component, can be obtained.

The above high pass filter 22 passes the emphasized high frequency noise signal component. The amplifier 23 amplifies the signal up to a predetermined level. Also, the limiter 24 passes only a signal, which is in the limiter level, as noise. Moreover, the low pass filter 25 is provided in order to adjust a phase.

Figure 4:
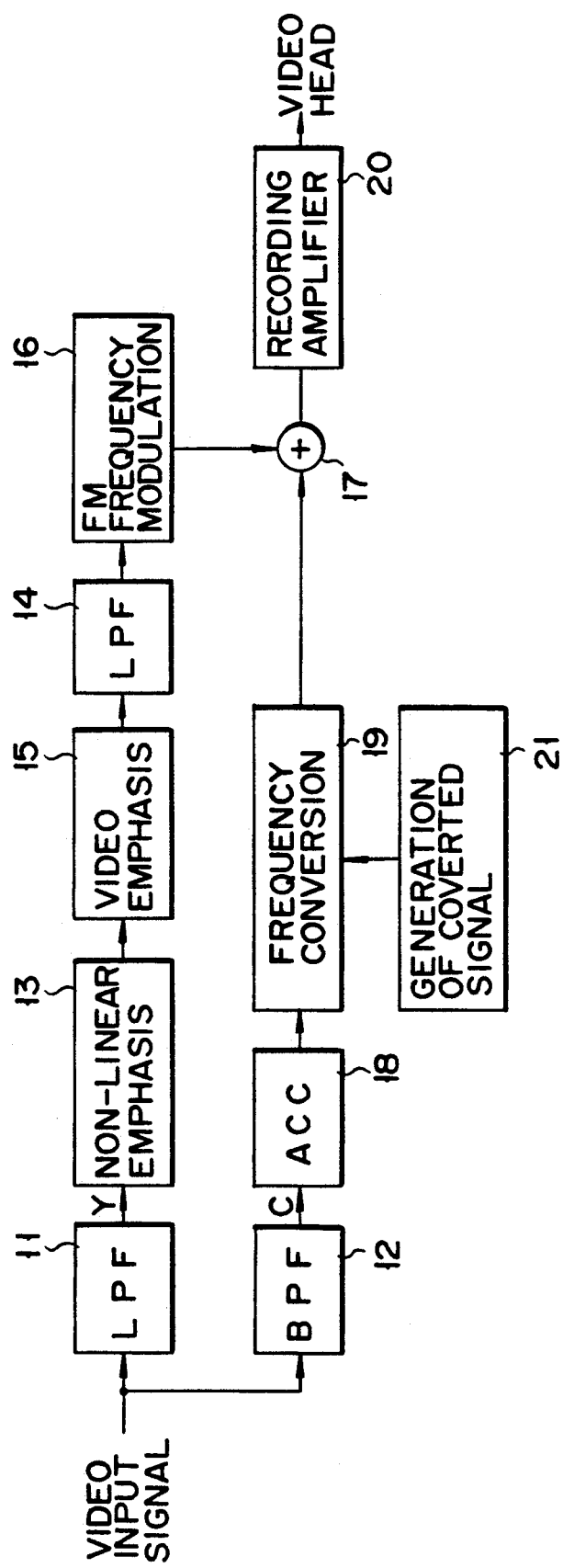
FIG. 4 is a circuit diagram showing a modification of the embodiment of FIG. 1.

FIG. 4 is a circuit structure showing a modification of the embodiment of FIG. 1. In this drawing, an LPF 14 is provided on the backward stage of the video emphasis circuit 15, in order to remove the high frequency signal component which is generated when the signal is emphasized by the non-linear emphasis circuit 13 and the video emphasis circuit 15.

An operation of this circuit will be explained with reference to FIGS. 5A to 5D. First of all, the luminance signal is separated from the video input signal by the low pass filter 11. FIG. 5A shows an output characteristic of the low pass filter 11. As shown in this figure, the luminance signal component, which is a signal component whose cutoff frequency is $f_0$ or less, has a constant gain (G) which is sufficiently high. However, the gain of a noise signal component having frequency of $f_0$ or more is controlled low. The luminance signal component separated by the low pass filter 11 is emphasized by the non-linear emphasis circuit 13 and an output characteristic as shown in FIG. 5B can be obtained. Thereafter, the signal is further emphasized by the video emphasis circuit 15 and an output characteristic as shown in FIG. 5C can be obtained. Then, the high frequency noise component is removed from the output of the non-linear emphasis circuit 15 by the low pass filter 14. FIG. 5D shows the output characteristic of the low pass filter 14. As shown in the drawing, the luminance signal component, which is the signal component whose cutoff frequency is $f_0$ or less, has a constant gain (G) which is sufficiently high. However, the gain of the noise signal component having frequency of $f_0$ or more is controlled low.

In the circuit of the above embodiment, the difference between the current level of the signal to be supplied to the frequency modulator 16 and the level having frequency of $f_0$ is shown by A of FIG. 5D. On the other hand, in the conventional circuit, such a difference is shown by B of FIG. 5C. Thereby, the high frequency noise signal component, which is included in the signal to be supplied to the frequency modulator 16, is largely reduced as compared with the conventional circuit. As a result, since the noise component to be supplied to the video head is lessened, a good quality image can be obtained when the signal is once recorded, and then reproduced.

Figure 6:
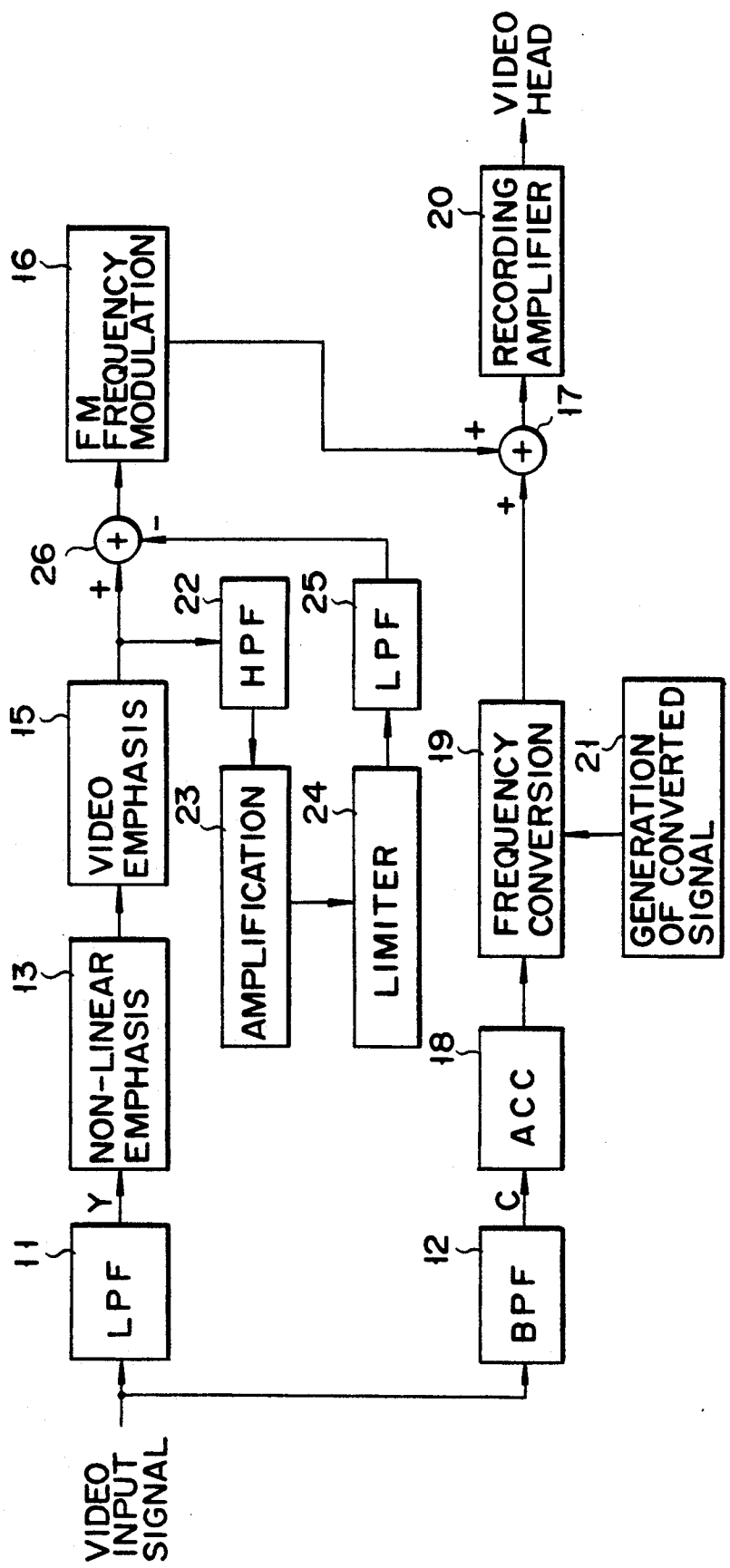
FIG. 6 is a circuit diagram showing a modification of the embodiment of FIG. 3.

FIG. 6 is a circuit structure showing a modification of the embodiment of FIG. 3. In this drawing, a loop, which comprises HPF 22 shown in FIG. 3, amplifier 23, limiter 24, LPF 25 and subtracter 26, is provided on the backward stage of the video emphasis circuit 15.

By such a circuit structure, noise removing effect, which is similar to FIG. 3, can be obtained.

Additionally, the present invention is not intended to be limited to the above-mentioned embodiments, and various modifications may be made. For example, in an actual circuit, the signal, which is frequency-modulated by the frequency modulator 16, is supplied to the adder 17 via the high pass filter. Also, the signal, which is frequency-converted by the frequency converter 19, is supplied to the adder 17 via the low pass filter. However, in the above-mentioned embodiments, these operations has omitted to clarify the explanation. Moreover, there is a case that the signal emphasized by the video emphasis circuit 15 is clamped or clipped by a clamping and clipping circuit.

According to the present invention, since the emphasized high frequency noise signal component is removed when the luminance signal is processed by a nonlinear emphasis and a video emphasis, the present invention can provide a video signal processor which can obtain a high quality of image in reproduction.

Additional advantages and modifications will readily occur to those skilled in the art. Therefore, the invention in its broader aspects is not limited to the specific details and representative devices shown and described herein. Accordingly, various modifications may be made without departing from the spirit or scope of the general inventive concept as defined by the appended claims and their equivalents.

What is claimed is:

1. A video signal processor, comprising:
   first filter means for filtering an input video signal and extracting a low frequency component;
   first emphasis means for emphasizing said low frequency component extracted by said first filter means, and outputting a first emphasized signal;
   noise removing means for removing a noise component from said first emphasized signal output by said first emphasis means, and outputting a noise-removed signal; and
   second emphasis means for emphasizing said noise-removed signal output by said noise removing means, and outputting a second emphasized signal.

2. The video signal processor according to claim 1, wherein said noise removing means has second filter means for filtering said first emphasized signal output by said first emphasis means and extracting the low frequency component.

3. The video signal processor according to claim 1, wherein said noise removing means has high frequency filtering means for filtering said first emphasized signal output by said first emphasis means and extracting a high frequency component, limiter means for limiting a level of said high frequency component extracted by said high frequency filtering means and outputting a level-limited signal, and second filtering means for filtering said level-limited signal output by said limiter means and extracting the low frequency component, subtracting means for performing subtraction between said first emphasized signal output and said low frequency component extracted by said second filtering means.

4. The video signal processor according to claim 1, wherein said first emphasis means has nonlinear emphasis means.

5. The video signal processor according to claim 1, wherein said second emphasis means has video emphasis means.

6. A video signal processor, comprising:
   first filter means for filtering an input video signal and extracting a low frequency component;
   first emphasis means for emphasizing said low frequency component extracted by said first filter means, and outputting a first emphasized signal;
   noise removing means for removing a noise component from said first emphasized signal output by said first emphasis means, and outputting a noise-removed signal; and
   second emphasis means for emphasizing said noise-removed signal output by said noise removing means, and outputting a second emphasized signal.
   converting means for converting said second emphasized signal output by said second emphasis means into a frequency-modulated signal.

7. The video signal processor according to claim 6, wherein said noise removing means has second filtering means for filtering said first emphasized signal output by said first emphasis means and extracting the low frequency component.

8. The video signal processor according to claim 6, wherein said noise removing means has high frequency filtering means for filtering said first emphasized signal output by said first emphasis means and extracting a high frequency component, limiter means for limiting a level of said high frequency component extracted by said high frequency filtering means and outputting a level-limited signal, and second filtering means for filtering said level-limited signal output by said limiter means and extracting a low frequency component, subtracting means for performing subtraction between said first emphasized signal output and said low frequency component extracted by said second filtering means.

9. The video signal processor according to claim 6, wherein said first emphasis means has a non-linear emphasis means.

10. The video signal processor according to claim 6, wherein said second emphasis means has a video emphasis circuit.

11. A video signal processor, comprising:
    first filter means for filtering an input video signal and extracting a low frequency component;
    first emphasis means for emphasizing said low frequency component extracted by said first filter means, and outputting a first emphasized signal;
    second emphasis means for emphasizing said first emphasized signal output by said first emphasis means, and outputting a second emphasized signal;
    noise removing means for removing a noise component from said second emphasized signal output by said second emphasis means, and outputting a noise-removed signal; and
    converting means for converting said noise-removed signal output by said noise removing means into a frequency-modulated signal.

12. The video signal processor according to claim 11, wherein said noise removing means has second filtering means for filtering said second emphasized signal output by said second emphasis means and extracting the low frequency component.

13. The video signal processor according to claim 11, wherein said noise removing means has high frequency filtering means for filtering said second emphasized signal output by said second emphasis means and extracting a high frequency component, limiter means for limiting a level of said high frequency component extracted by said high frequency filtering means and outputting a level-limited signal, and second filtering means for filtering said level-limited signal output by said limiter means and extracting the low frequency component, subtracting means for performing subtraction between said second emphasized signal output and said low frequency component extracted by said second filtering means.

14. The video signal processor according to claim 11, wherein said first emphasis means has non-linear emphasis circuit.

15. The video signal processor according to claim 11, wherein said second emphasis means has a video emphasis circuit.

16. A video signal processing apparatus comprising:
    first filter means for filtering an input video signal and extracting a low frequency component;
    first emphasis means for emphasizing said low frequency component extracted by said first filter means, and outputting a first emphasized signal;
    second emphasis means for emphasizing said first emphasized signal output by said first emphasis means, and outputting a second emphasized signal; and noise removing means for removing a noise component from said second emphasized signal output by said second emphasis means, and outputting a noise-removed signal.

17. The video signal processor according to claim 16, wherein said noise removing means has second filter means for filtering said second emphasized signal output by said second emphasis means, and extracting the low frequency component.

18. The video signal processor according to claim 16, wherein said noise removing means has high frequency filtering means for filtering said second emphasized signal output by said second emphasis means and extracting a high frequency component, limiter means for limiting a level of said high frequency component extracted by said high frequency filtering means and outputting a level-limited signal, and second filtering means for filtering said level-limited signal output by said limiter means and extracting the low frequency component, subtracting means for performing subtraction between said second emphasized signal output and said low frequency component extracted by said second filtering means.

19. The video signal processor according to claim 16, wherein said first emphasis means has non-linear emphasis means.

20. The video signal processor according to claim 16, wherein said second emphasis means has video emphasis means.

* * * * *